United States Patent [19]

Schatz

[11] 3,927,352
[45] Dec. 16, 1975

[54] LOGIC SYSTEM FOR PROTECTING TRANSISTORS

[75] Inventor: Douglas S. Schatz, Santa Clara, Calif.

[73] Assignee: Applied Materials, Inc., Santa Clara, Calif.

[22] Filed: May 22, 1974

[21] Appl. No.: 472,193

[52] U.S. Cl................. 317/27 R; 317/31; 328/147; 307/231
[51] Int. Cl.² ....................................... H02H 7/122
[58] Field of Search...317/31, 33 VR, 33 SC, 36 TD, 317/22 47, 27 R; 328/133, 150, 147, 146; 307/273, 236, 234, 232, 296; 321/2, 11, 14

[56] References Cited
UNITED STATES PATENTS

| | | | |
|---|---|---|---|
| 3,341,765 | 9/1967 | Rogers, Jr. et al...................... | 321/2 |
| 3,432,737 | 3/1969 | Hunter et al............................ | 321/2 |
| 3,611,162 | 10/1971 | Tochitani........................... | 317/31 X |
| 3,670,234 | 6/1972 | Joyce................................. | 317/31 X |
| 3,771,040 | 11/1973 | Fletcher et al......................... | 321/2 |

Primary Examiner—J. D. Miller
Assistant Examiner—Patrick R. Salce
Attorney, Agent, or Firm—Flehr, Hohbach, Test, Albritton & Herbert

[57] ABSTRACT

System for detecting malfunctions in the operation of switching transistors in power supplies. The levels of the transistors output signals are monitored during sampling periods, and a fault is detected if the level of an output signal differs from a predetermined level. The sampling period is timed to occur at a predetermined time in the cycle of the output signal, and frequency variations can be detected as well as short circuits, open circuits and other malfunctions. Means is included for turning off the power supply in response to a fault signal and thereafter restoring power until a predetermined number of faults have occurred.

9 Claims, 3 Drawing Figures

LOGIC SYSTEM FOR PROTECTING TRANSISTORS

BACKGROUND OF THE INVENTION

This invention pertains generally to power supplies and more particularly to a system for protecting switching transistors in the output stage of a power supply.

Switching transistors in the output stage of a power supply are subject to a number of malfunctions which can render the supply inoperative and damage or destroy the transistors. Transistors suitable for switching large amounts of current at high frequencies, e.g. 100 amperes at 50KHz, are relatively expensive, and at this level and frequency, they are particularly vulnerable to damage or destruction.

With a power supply operating at a predetermined frequency, the signal levels throughout the operating cycle are predictable if the supply is operating properly. It has been found that by comparing the actual signal levels with the predicted levels, malfunctions can be found and compensated for before the transistors are damaged.

SUMMARY AND OBJECTS OF THE INVENTION

The invention provides a system for detecting malfunctions in the operation of switching transistors in power supplies. The levels of the transistor output signals are monitored during sampling periods, and a fault is detected if the level of an output signal differs from a predetermined level. The sampling period is timed to occur at a predetermined time in the cycle of the output signal, and frequency variations can be detected as well as short circuits, open circuits and other malfunctions. Means is included for turning off the power supply in response to a fault signal and thereafter restoring power until a predetermined number of faults have occurred.

It is in general an object of the invention to provide a new and improved protective system for power supplies.

Another object of the invention is to provide a protective system of the above character utilizing logic techniques.

Additional objects and features of the invention will be apparent from the following description in which the preferred embodiment is set forth in detail in conjunction with the accompanying drawings.

DESCRIPTION OF THE PREFERRED EMBODIMENT

Figure 1:
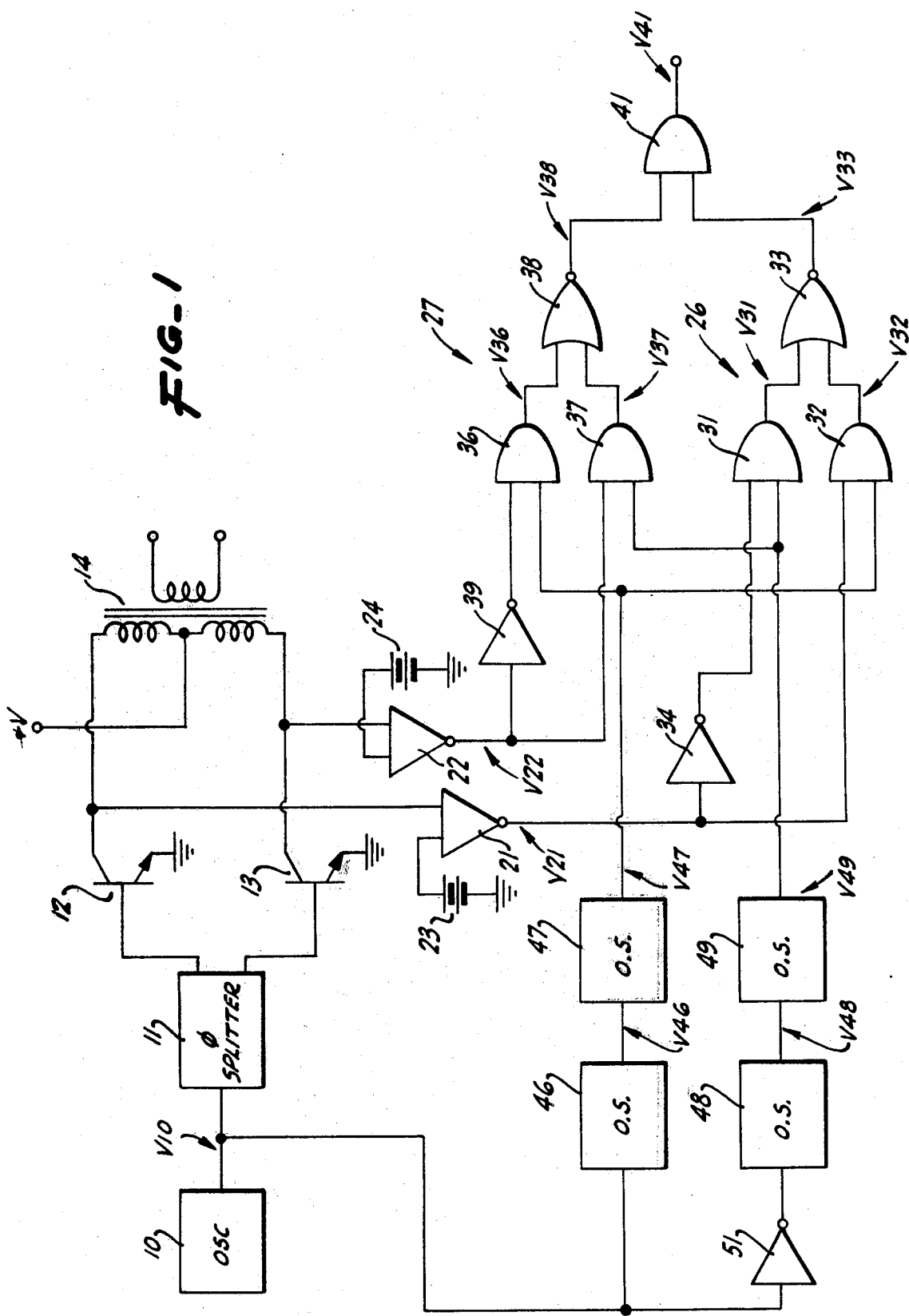
FIG. 1 is a circuit diagram, partially in block form, of a power supply with a protective system according to the invention.

In the drawings, the invention is illustrated in connection with a power supply comprising an oscillator 10 of suitable known design for producing a signal of predetermined frequency, for example 35–65KHz. The output of the oscillator is connected to a phase splitter 11 which delivers signals at the frequency of the oscillator signal and separated in phase by 180° to a push-pull output stage comprising transistors 12, 13 and an output transformer 14. Transistors 12 and 13 conduct during alternate half cycles of the oscillator signal, producing in the secondary of transformer 14 a power output which is in phase with the oscillator signal.

The outputs of transistors 12, 13 are monitored by voltage comparators 21, 22 which have inputs connected to the collectors of the respective transistors. Each of the comparators also receives a second input from a reference voltage source 23, 24.

The outputs of comparators 21, 22 are applied to logic gates 26, 27 commonly known as AND/OR select gates. Gate 26 comprises AND gates 31, 32 and a NOR gate 33, with the outputs of the AND gates connected to the inputs of the NOR gate. The output of comparator 21 is connected directly to one input of AND gate 32, and it is also connected to one input of AND gate 31 through an inverter 34.

AND/OR select gate 27 comprises AND gates 36, 37 and a NOR gate 38, with the outputs of the AND gates being connected to the input of the NOR gate. The output of comparator 22 is connected to one input of AND gate 37, and it is also connected to one input of AND gate 36 through inverter 39. The outputs of NOR gates 33 and 38 are connected to the inputs of an AND gate 41.

Means is provided for providing timing signals which define timing periods and control the operation of logic gates 26, 27. This means includes one-shot multivibrators 46, 47 and 48, 49 which provide timing signals during alternate half cycles of the oscillator signal. The input of multivibrator 46 is connected directly to the output of oscillator 10, and the input of multivibrator 48 is connected to the output of the oscillator through an inverter 51. These multivibrators serve to delay the start of the sampling period for a predetermined time after the outset of each half cycle of the oscillator signal, and in the preferred embodiment the delay is on the order of 1 microsecond for a 50KHz oscillator signal. The outputs of multivibrators 46, 48 are connected to the inputs of multivibrators 47, 49 which determine the length of the sampling periods. In the preferred embodiment, these multivibrators have a period on the order of 90% of one-half of the period of the oscillator signal, e.g. 9 microseconds for a 50KHz signal. The output of multivibrator 47 is connected to inputs of AND gates 32, 26, and the output of multivibrator 49 is connected to inputs of AND gates 31, 37.

Figure 2:
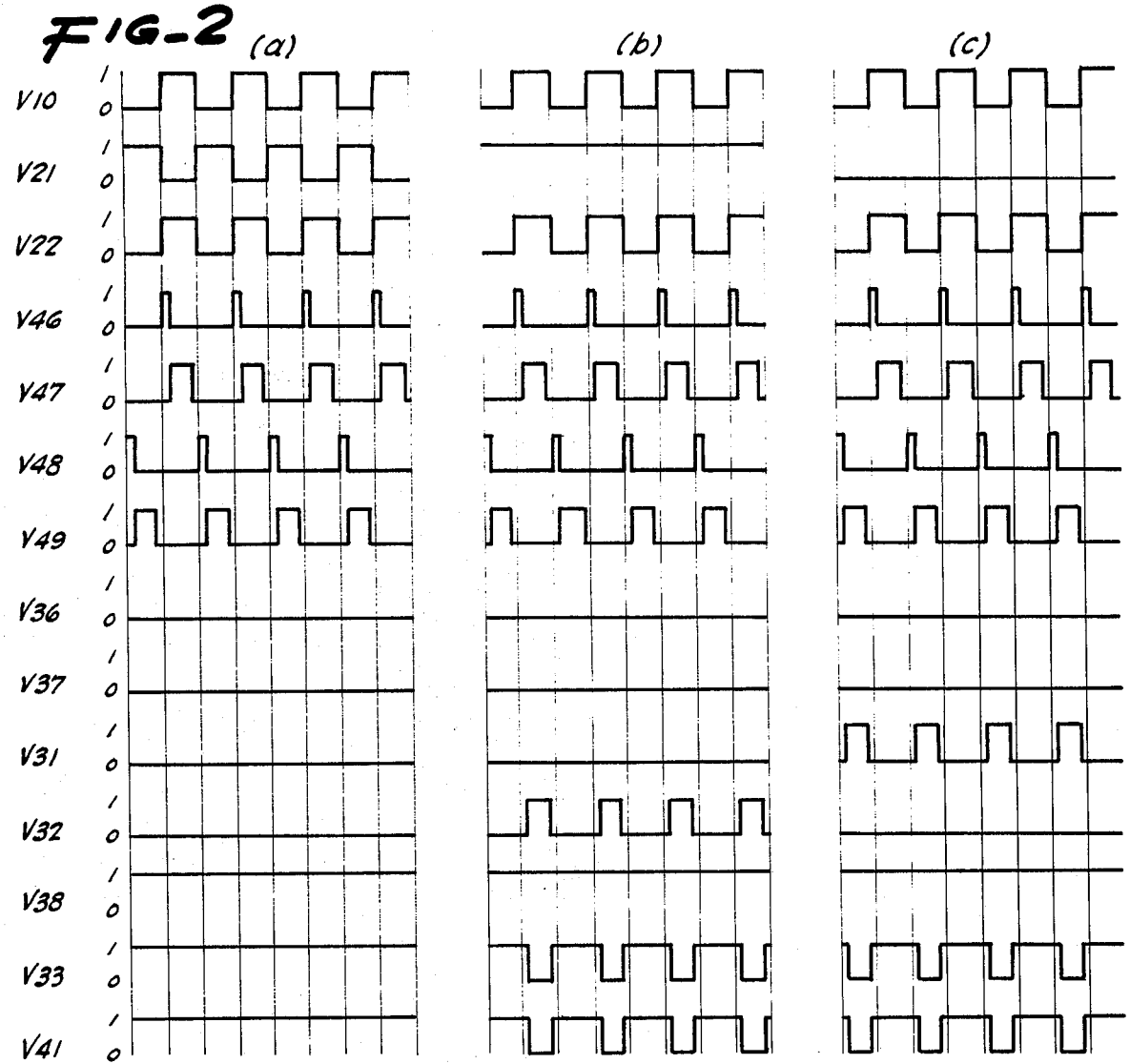
FIG. 2 is a graphical representation of the waveforms at different points in the circuit of FIG. 1.

Operation and use of the protective system of FIG. 1 can be described with reference to FIG. 2. Initially, it is assumed that the power supply is operating normally and that the output of transistor 12 is out of phase with oscillator signal V10 and the output of transistor 13 is in phase with the oscillator signal. Comparators 21, 22 continuously compare the transistor output signals with reference voltages 23, 24 and produce output signals V21, V22 which are high when the transistor outputs are above the reference levels and low when the outputs are below the reference levels. One-shot multivibrator 46 fires on each positive transition of oscillator signal V10, and multivibrator 48 fires on each negative transisiton of the oscillator signal. Multivibrator 47 fires on the negative transition of each pulse from multivibrator 46 to produce a timing or sampling signal V47 which is high when oscillator signal V10 is high. Multivibrator 49 fires on the negative transition of each pulse from multivibrator 48 to provide a timing or sampling signal V49 which is high when the oscillator signal is low.

With the power supply operating normally, the outputs of AND gates 31, 32, 36 and 37 remain low throughout the operating cycle, the outputs of NOR gates 33, 38 remain high, and output signal V41 also remains high, indicating the absence of a mulfunction.

In the event that one of the output transistors fails to turn on at the proper time, the output of the comparator for that transistor will be high when it should be low. With an open circuit in transistor 12, for example, the output of comparator 21 will be high continuously, as illustrated in FIG. 2(b). Assuming that transistor 13 is operating normally, the outputs of AND gates 36, 37 remain low, and the output of NOR gate 38 remains high, as in the previous example. The malfunction in transistor 12 is detected by AND gate 32, and the output of this gate is high during the sampling period defined by timing signal V47. Consequently, the outputs of NOR gate 33 and AND gate 41 are low during the V47 sampling period, indicating a fault condition.

In the event that one of the power supply transistors fails to turn off at the proper time, the output of the comparator for that transistor will be low when it should be high. If transistor 12 is shorted, for example, the output of comparator 21 remains low throughout the operating cycle, as illustrated in FIG. 2(c). This malfunction is detected by AND gate 31, and the output of the gate is high during the sampling period of timing signal V49. Consequently, the outputs of NOR gate 33 and AND gate 41 are low during this sampling period, indicating the fault condition.

A malfunction involving transistor 13 is detected by gate 27 in a manner similar to that described above. Insufficient drive or output current causes the output of one or both of the comparators to be low when it should be high, and these conditions are also detected in the manner described above. Similarly, if the frequency of the output current should change appreciably, the output of one or both transistors will be at the incorrect level for at least part of the cycle, and this malfunction is also detected in the manner described above.

Figure 3:
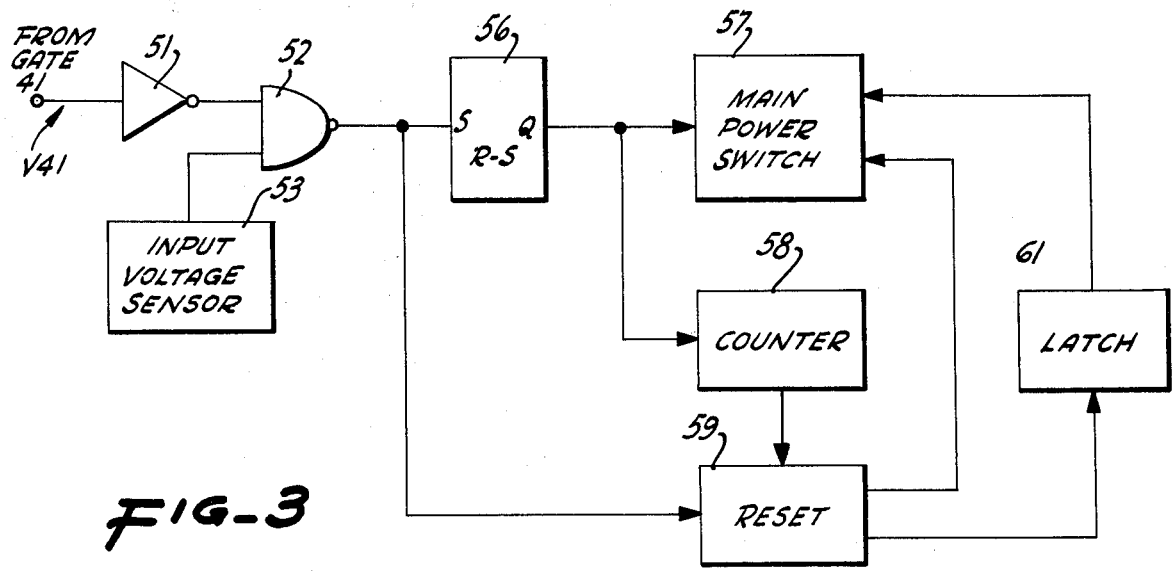
FIG. 3 is a block diagram of a control system for use with the protective system of FIG. 1.

In the control system illustrated in FIG. 3, the output of AND gate 41 is connected to the input of an inverter 51. The output of the inverter is connected to one input of a NAND gate 52, and this gate receives a second input from a voltage sensor 53. This sensor monitors the level of the input voltage to the power supply and delivers an inhibiting signal to the NAND gate in the event that the input voltage drops below a predetermined level, e.g. 20% of its normal value. The NAND gate and voltage sensor prevent the power supply from being turned off when the voltage is low and there is little danger of damage to the transistors.

The output of NAND gate 52 is connected to the set input of an R-S flip-flop 56. The output of the flip-flop is connected to a power switch 57 which interrupts the delivery of power to the power supply in response to each fault signal. The output of the flip-flop is also connected to a counter 58 which counts the fault signals. This counter is reset to its initial level in the event that the interval between pulses exceeds a predetermined time, e.g. 90 seconds.

The output of NAND gate 52 is also connected to the input of a reset circuit 59. This circuit monitors the count in counter 58 and delivers a reset signal to switch 57 for restoring power to the supply as long as the count in counter 58 is below a predetermined number, for example three fault signals. The reset signals are delivered in response to the fault signals from NAND gate 52, and they are delayed about one second so that the malfunction will have an opportunity to be corrected before power is restored. In the event that the number of fault signals counted exceeds the predetermined number, reset circuit 59 delivers an output signal to a latch 61 which turns the power switch off so that power can only be restored mannally. If desired, the latch can be connected to a suitable device for indicating the presence of a malfunction which must be corrected before power is restored.

The invention has a number of important features and advantages. It can detect a number of different malfunctions in the output of a power supply, for example a short or open circuit, insufficient drive, low output current, or a deviation in operating frequency. These malfunctions are detected on a cycle-by-cycle basis, and this permits the power supply to be turned off before the transistors are damaged. In the event that the malfunction is of short duration, normal operation of the supply is restored automatically.

It is apparent from the foregoing that a new and improved protective system for switching transistors has been provided. While only the presently preferred embodiment has been described, as will be apparent to those faimilar with the art, certain changes and modifications can be made without departing from the scope of the invention as defined by the following claims.

I claim:

1. In a system for detecting a malfunction in the operation of a switching transistor turned on and off cyclically to produce a power output signal which oscillates between first and second predetermined levels at a predetermined rate:
A. means for providing first and second timing signals defining first and second sampling periods during portions of alternate half cycles of the output signal; and
B. logic gate means for monitoring the level of the output signal and providing a fault signal in the event that the level differs from the first or second predetermined level during the first and second sampling periods, respectively, said logic gate means comprising:
1. a first AND gate receiving inputs corresponding to the first timing signal and the output signal;
2. a second AND gate receiving inputs corresponding to the second timing signal and the inverse of the output signal; and
3. an additional gate having inputs connected to the outputs of the AND gates.

2. The system of claim 1 wherein the means for providing timing signals includes a one-shot multivibrator.

3. The system of claim 2 further including means for firing the one-shot multivibrator a predetermined time after the outset of a half cycle of the output signal.

4. In combination with a power supply having an oscillator for producing a signal of predetermined frequency and at least one output transistor responsive to the oscillator signal for providing a power output signal at the predetermined frequency, a protective system for the transistor comprising:
A. means responsive to the oscillator signal for providing a first timing signal defining a first sampling period during a first portion of each cycle of the power output signal;
B. means responsive to the first timing signal for monitoring the power output signal and providing a fault signal in the event that the level of the power output signal differs from a predetermined level during the first sampling period;

C. means for providing a second timing signal defining a second sampling period during a second portion of each cycle of the power output signal; and D. means responsive to the second timing signal for monitoring the power output signal and providing a fault signal in the event that the level of the power signal differs from a second predetermined level during the second sampling period.

5. The combination of claim 4 wherein the means for providing a first signal includes a one-shot multivibrator.

6. The combination of claim 5 further including means for firing the one-shot multivibrator a predetermined time after the outset of each cycle of the oscillator signal.

7. The combination of claim 4 wherein the means for monitoring the power output signal comprise logic circuit means responsive to the respective timing signals and the power output signal.

8. The combination of claim 7 wherein the logic circuit means includes logic gates having output states corresponding to the levels of the power output signal during the sampling periods.

9. In combination with a power supply having an oscillator for producing a signal of predetermined frequency and at least one output transistor responsive to the oscillator signal for providing a power output signal at the predetermined frequency, a protective system for the transistor comprising:

A. means responsive to the oscillator signal for providing a timing signal defining a sampling period during a portion of each cycle of the power out signal;

B. means responsive to the timing signal for monitoring the power output signal and providing a fault signal in the event that the level of the power output signal differs from a predetermined level during the sampling period;

C. means for providing a second timing signal defining a second sampling period during a second portion of each cycle of the power output signal; and D. means responsive to the second timing signal for monitoring the power output signal and providing a fault signal in the event that the level of the power output signal differs from a second predetermined level during the second sampling period.

* * * * *